F. W. HOCHSTETTER.
MOVING PICTURE MACHINE.
APPLICATION FILED MAR. 22, 1919.

1,372,621.

Patented Mar. 22, 1921.
6 SHEETS—SHEET 1.

Inventor
Frederick W. Hochstetter
By his Attorney

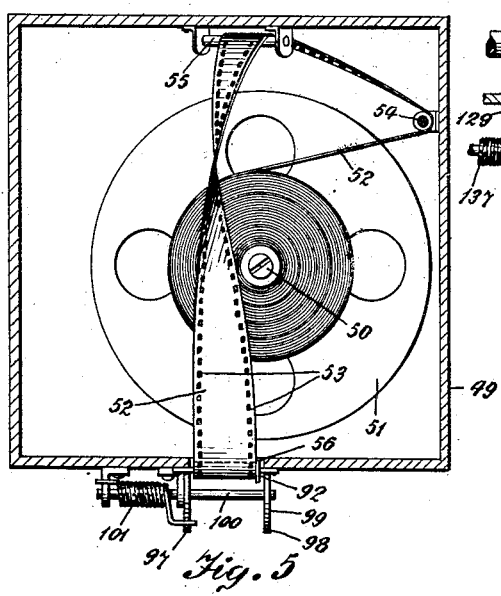
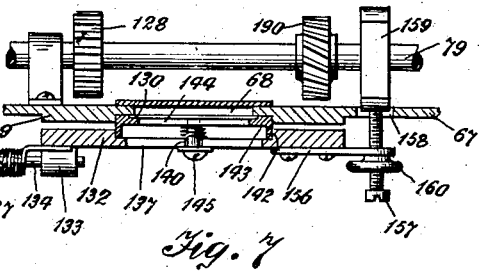
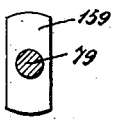
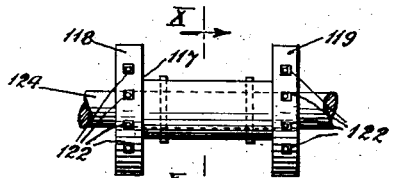
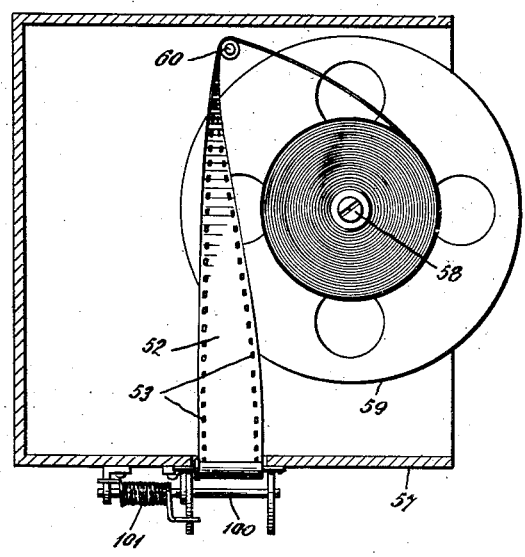
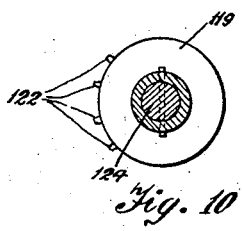
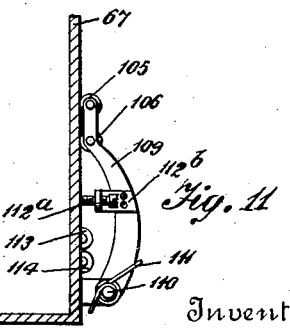

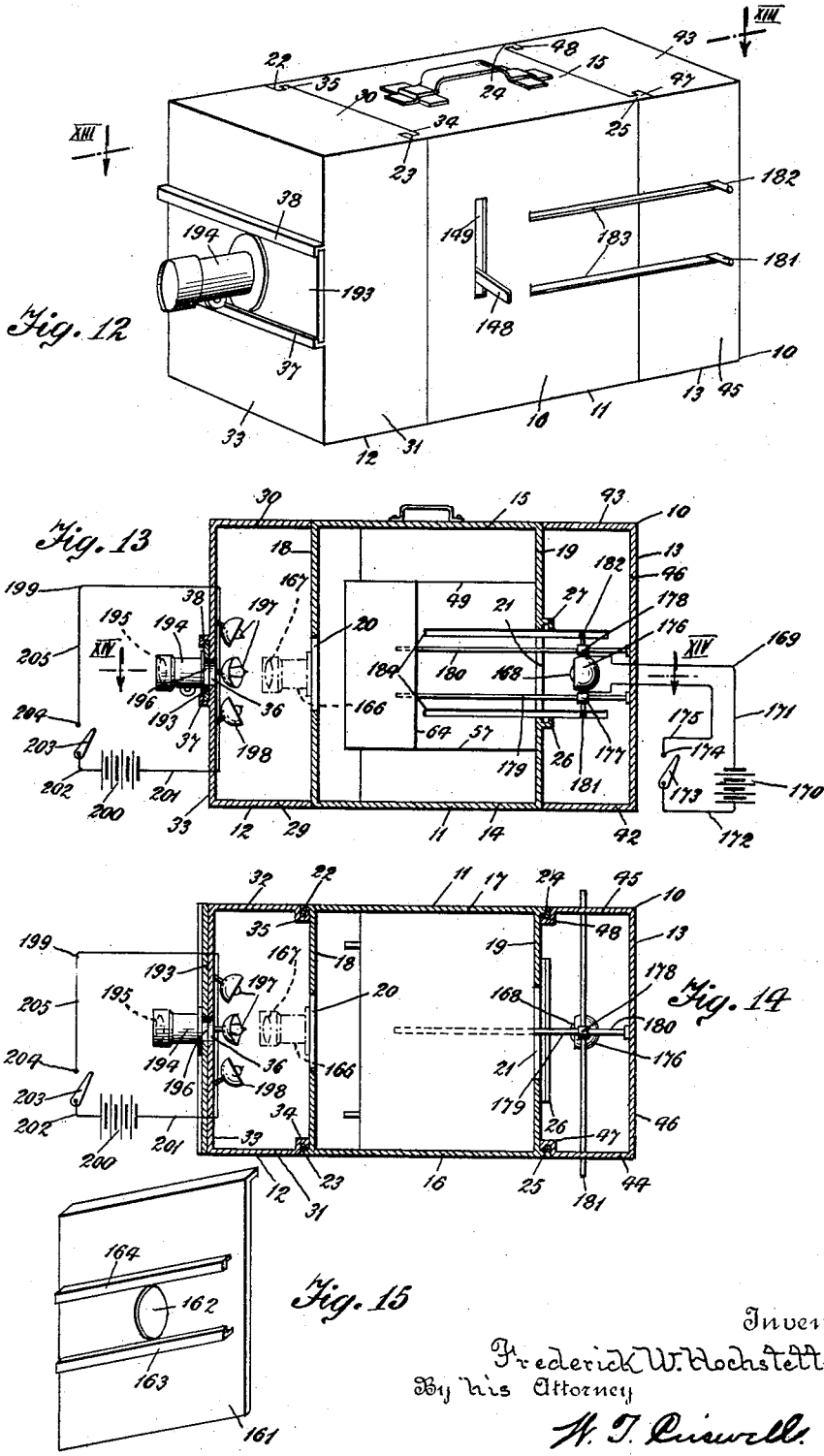

UNITED STATES PATENT OFFICE.

FREDERICK W. HOCHSTETTER, OF NEW YORK, N. Y., ASSIGNOR OF ONE-HALF TO PAUL M. PIERSON, OF SCARBORO, NEW YORK.

MOVING-PICTURE MACHINE.

1,372,621.  Specification of Letters Patent.  Patented Mar. 22, 1921.

Application filed March 22, 1919. Serial No. 284,390.

*To all whom it may concern:*

Be it known that I, FREDERICK W. HOCHSTETTER, a citizen of the United States, and a resident of New York, county and State of New York, have invented a certain new and useful Improvement in Moving-Picture Machines, of which the following is a full, clear, and exact specification.

This invention relates to a class of devices adapted to be used for producing and exhibiting moving pictures.

My invention has for its object primarily to provide a moving picture machine designed to be employed as a camera whereby animated pictures of objects may be photographed on a sensitized transparent film or strip, or photographed on a sensitized opaque film, or strip as well as being subsequently employed as a projecting apparatus for exhibiting the pictures of either the transparent strip, or the opaque strip on a screen after the pictures are developed, the machine being constructed so that it may be independently untilized for these purposes, thus overcoming the requirement for employing separate machines, and by providing for the use of an opaque strip, such as cloth, paper or like material treated so as to be non-combustible, the usual danger of causing fire is largely eliminated so that the machine may be especially adaptable for use in schools, or in homes as well as elsewhere. The invention consists essentially of a casing, or support having a front exposure window in the optical axis of a lens and in the casing is arranged mechanism for transmitting a transparent, or opaque strip from a delivery reel to the window as well as for continuously transmitting the strip from the window to a receiving reel. Operable by the transmitting mechanism is a continuously rotatable element adapted to engage the strip at intervals whereby the movement of the strip passing before the window and in the optical axis of the lens will be intermittently checked for exposing successive parts of the strip through the window when the pictures are being taken and also when the pictures are projected.

Other objects of the invention are to provide means on the casing for closing and opening the passage through the exposure window; to provide in front of the casing before the exposure window a removable chamber in which is arranged one, or more lamps with one or more reflectors for deflecting the light of the lamps through the exposure window; and to provide on the back of the casing a second removable chamber in which may be mounted an adjustable lamp with a reflector for deflecting the rays of light from the lamp through the casing and through its front exposure window.

With these and other objects in view, the invention will be hereinafter more particularly described with reference to the accompanying drawing forming a part of this specification in which similar characters of reference indicate corresponding parts in all the views, and will then be pointed out in the claims at the end of the description.

In the drawings, Figure 1 is a longitudinal vertical section, partly in detail, taken through the casing of one form of moving picture machine embodying my invention, and which shows a side elevation of the transmitting mechanism employed in the machine.

Fig. 5 is a reduced detail sectional view taken on the line V—V of Fig. 3.

Fig. 6 is a reduced detail sectional view taken on the line VI—VI of Fig. 3.

Fig. 7 is an enlarged fragmentary detail sectional view taken on the line VII—VII of Fig. 3.

Fig. 8 is a view, partly in section, of a cam employed in the machine.

Fig. 9 is an enlarged fragmentary view showing an elevation of the rotatable element used in the machine for intermittently checking the movement of the transparent, or opaque strip.

Fig. 10 is a detail sectional view taken on the line X—X of Fig. 9.

Fig. 11 is an enlarged fragmentary detail sectional view taken on the line XI—XI of Fig. 3.

Fig. 12 is a perspective view of the apparatus when all the parts thereof are assembled.

Fig. 13 is a sectional view, partly in detail, taken through the apparatus on the line XIII—XIII of Fig. 12.

Fig. 14 is a sectional view, partly in detail, taken through the apparatus on the line XIV—XIV of Fig. 13, and Fig. 15 is a perspective view of a slide used in the apparatus for permitting interchangeable lenses to be employed for taking and projecting the pictures.

Figure 1:
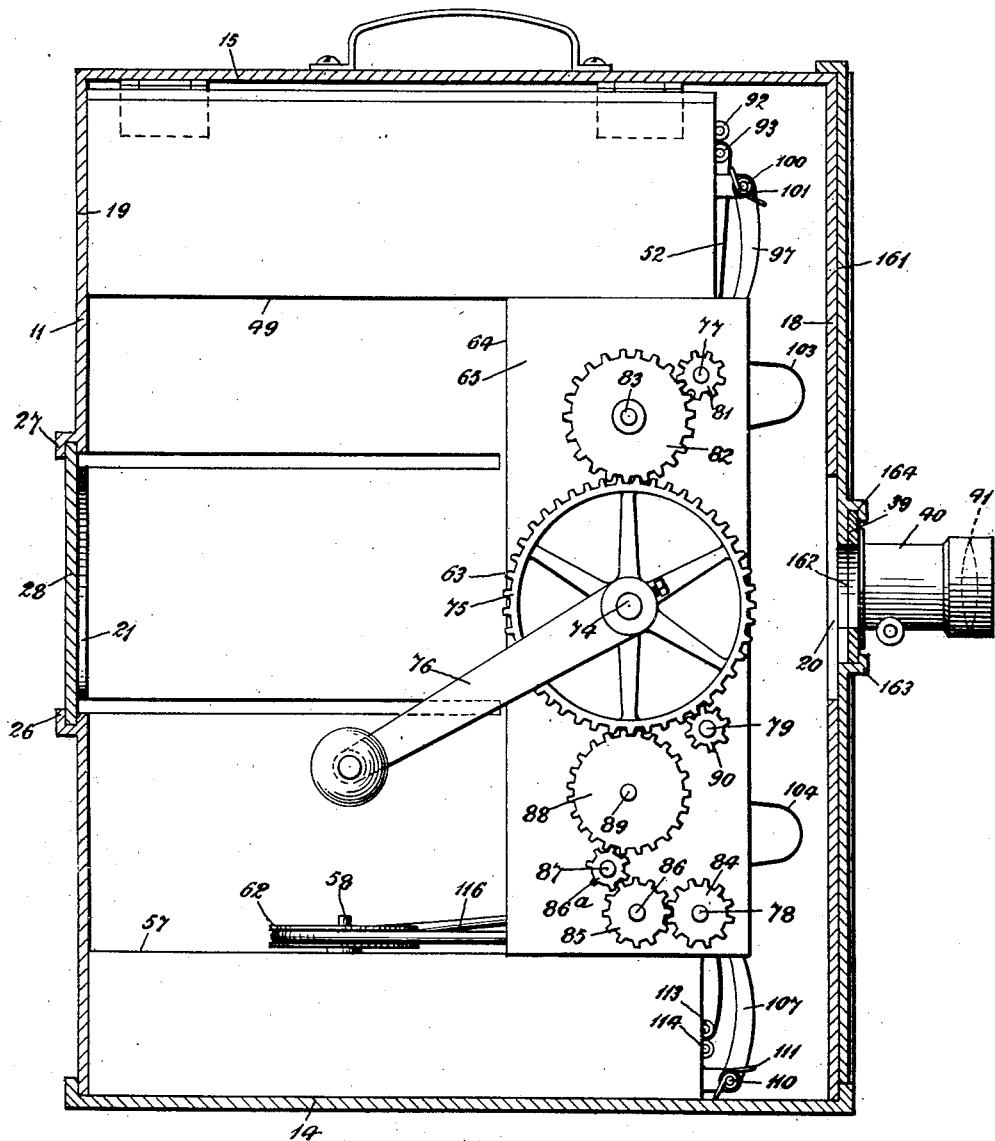

The moving picture machine may have a casing 10 with a main section, or chamber 11, a detachable front section, or chamber 12, and a detachable rear section, or chamber 13. The main section, or chamber 11 is preferably substantially rectangular in shape to provide a bottom 14, a top 15, side walls 16 and 17, a front wall 18, and a back wall 19. In the front wall 18 is an exposure window 20, and in the rear wall 19 is an opening 21 in register with the window 20. Extending forwardly from the front wall 18 of the main section of the casing, and preferably at the junctures thereof with the side walls 16 and 17, are two spaced vertically disposed grooved flanges 22 and 23, the grooves of which are in opposed relation, and extending rearwardly from the back wall 19 at its junctures with the side walls are two other spaced vertically disposed grooved flanges 24 and 25, the grooves of which are in opposition. Also projecting rearwardly from the back wall 19 are two transversely disposed grooved flanges 26 and 27, one above and one below the opening 21, and the grooves of these flanges are opposed to each other for reception of a removable slide, or plate 28 for closing this opening.

The front section, or chamber 12 of the casing is somewhat of the shape of a box of preferably the same height and width as the main section 11 to provide a bottom 29, top 30, side walls 31 and 32, and a front wall 33 while the rear of this front section is open. Projecting inwardly from the side walls of the front section 12 are two vertically disposed grooved flanges 34 and 35 adapted to be movably inserted in the grooved flanges 22 and 23 of the main section of the casing for detachably connecting the front section to this main section. Through the front wall 33 of the front section 12 is an aperture, or window 36 in register with the exposure window 20 of the main section 11. On the exterior of the front wall of the section 12 are two spaced transverse grooved flanges 37 and 38, one above and one below the window 36, and the grooves of these flanges are in opposed relation to allow a slide, as 39, with a barrel, as 40, having one or more projecting lenses, as 41, therein to be used on the front section. The rear section, or chamber 13 of the casing is also somewhat box-like in shape of preferably a similar height and width as the main section 11 of the casing to provide a bottom 42, top 43, side walls 44 and 45, and a back wall 46 while the front of this rear section is open. Extending inwardly from the side walls of this rear section are two vertically disposed grooved flanges 47 and 48 adapted to be grooved flanges in the grooved flanges 24 and 25 on the back of the main section, or chamber 11 of the casing 10 to detachably fasten this rear section, or chamber to the main section.

In the top of the main section, or chamber 11 of the casing 10 is a magazine, or box, as 49, having on the interior thereof a rigid post, as 50, projecting upwardly from the central part of its bottom, and on this post is removably disposed a freely revoluble delivery reel 51 on which is wrapped a transparent film or strip, or an opaque film or strip, as 52, provided with the usual rows of spaced apertures 53 adjacent to its marginal edges for transmission through the machine. Also in the magazine 49 may be a vertically disposed roller 54 arranged contiguous to one of the side walls of the magazine, and spaced from the rear wall of the magazine may be a transversely disposed roller, as 55, while in the upper part of the front wall of the magazine is an opening 56. In the bottom of the main section, or chamber 11 of the casing is a second magazine, or box, as 57, having a revoluble post, as 58, projecting upwardly therein from its bottom, and on this post is removably disposed a reel 59 adapted to be revolved when the post 58 is rotated, the reel 59 being adapted to receive the transparent film or strip, or the opaque film or strip when transmitted through the machine from the delivery reel. In the magazine 57 may also be provided a vertically disposed roller, as 60, which is spaced from the post 58, and through the front wall of this magazine is an opening 61. The post 58 is of a length so that its upper end extends through an opening in the top of the magazine 57 for some distance thereabove, and on this projecting end of the rotatable post is held a pulley 62.

In order to transmit the transparent, or opaque strip from the delivery reel 51 through the main section of the casing so as to be exposed through the window 20 for being wrapped on the receiving reel 59, I provide a form of mechanism, as 63. The mechanism 63 may consist of a frame 64 constructed of two spaced uprights, or side plates 65 and 66 which are arranged between the magazines 49 and 57, and between these side plates is a front plate 67 which is spaced a distance from the front wall of the main section of the casing. In the central part of the front plate 67 of the frame 64 is a window 68 in register with the window 20 of the main section of the casing. In the upper part of this front plate directly above the window 68 is the opening 56 of the magazine 49, and in proximity to the lower edge of the front plate directly under the window 68 is a second opening 70. Also through the front plate contiguous to the opening 70 is another opening 71, and in the front plate between the opening 70 and the window 68 are two alined openings 72 and 73 which are spaced apart a distance approximately equal to the space between the apertures of the transparent, or opaque strip. In a bearing provided on the central part of the side plate 65 is journaled a short drive shaft 74, and on this shaft is held a gear 75. Also on the shaft 74 is held a crank handle 76 for permitting this shaft and the gear 75 to be manually revolved, though the drive shaft may be driven by any other suitable means. Journaled in the upper parts of the side plates of the frame 64, and on a longitudinal plane corresponding with the center of the opening 69 is a shaft 77 extending across the back of the front plate, and this shaft is of a length so that one of its ends extends between the side plate 65 and the opposed wall of the main section of the casing. Journaled in the lower parts of the side plates of the frame, and on a longitudinal plane similar to the center of the opening 70 is a second shaft 78 disposed across the back of the front plate, and this shaft is of a length so that one of its ends extends between the side plate 65 and the opposed wall of the main section of the casing. Between the pair of openings 72 and 73 and the window 68 is a third shaft 79 disposed transversely of the back of the front plate of the frame, and one end of this shaft is journaled in the side plate 65 of the frame, while the other end of the shaft is journaled in a bearing, as 80, provided on the back of the front plate, this third shaft being of a length so that one of its ends also extends between the side plate 65 and the opposing wall of the main section of the casing. On the end of the shaft 77 projecting from the side plate 65 of the frame 64 is a pinion 81 in mesh with an idler gear 82 which is freely revoluble on a stud 83 held in the side plate 65, and this idler gear is in mesh with the drive gear 75. On the end of the shaft 78 extending from the side plate 65 is held a gear 84 which meshes with an idler gear 85 freely revoluble on a stud 86 projecting from the side plate 65, and meshing with the idler gear 85 is an idler pinion 86ª which is freely revoluble on a stud 87 also projecting from the side plate 65 of the frame 64. The idler pinion 86ª is in mesh with another idler gear 88 freely rotatable on a stud 89 projecting from the side plate 65, and the idler gear 88 meshes with the drive gear 75. On the end of the shaft 79 projecting from the side plate 65 is a pinion 90, meshing with the drive gear 75, and also on the stud 89 is a drive wheel 91. Thus when the gear 75 is driven with the rotation of the shaft 74 by turning the crank handle 76, these sets of gears and pinions will be operated synchronously, the idlers 82, 88, 86ª, 85 serving to cause the pinion 81 and the gear 84 to revolve in a similar direction to the drive gear 75 for rotating the shafts 77 and 78 in the same direction as the drive shaft 74 is driven, while the pinion 90 being in mesh with the drive gear 75 this pinion with the shaft 79 will be oppositely rotated to the rotation of the drive shaft, and by properly proportioning this gearing the pinions 81, 90 and gear 84 together with shafts 77, 78, 79 will be operated at like speeds, or as near corresponding speeds as may be desired, though in instances the speeds of these shafts may be suitably varied with respect to each other by varying the diameters of the gears and pinions accordingly. To transmit a transparent strip, or opaque strip through the machine for exposing successive portions thereof before the window 20 of the main section 11 of the casing, the strip is guided from the delivery reel 51 over the rollers 54 and 55 in the magazine 49, and the strip is passed through the opening 56 of this magazine as well as being guided between two rollers 92 and 93 arranged in closely spaced proximity on the exterior of the magazine across its opening 56. The strip is then passed under two spaced compression rollers 95 and 96 arranged between the lower ends of two spaced arms 97 and 98 of a bracket 99, and the upper ends of these arms are held to a transverse rod 100 which is rotatable on the upper part of the front plate 67 of the frame 64 of the mechanism 63. On the rod 100 is a spring 101 having one of its ends contacting with the front plate of the frame while its other end is in engagement with one of the arms of the bracket 99 for serving to yieldingly force the arms and the rollers 95 and 96 toward the front plate of the frame 64. The arms of the spring actuated bracket 99 are of lengths so that the rollers 95 and 96 are disposed in the opening 69 of the front plate of the frame, and on the shaft 77 is a sprocket, as 102, which may be of the customary form having spaced rows of teeth, as shown, for engaging the apertures 53 of the strip. The sprocket 102 is disposed outwardly of the opening 69, and the strip is arranged in engagement therewith, the rollers 95 and 96 serving to movably hold the strip on the sprocket. A loop, as 103, is then formed in the strip after which the strip is disposed downwardly on the front of the front plate 67 of the frame 64 so as to be transmitted before the windows 68 of this front plate and before the exposure window 20 of the main section of the casing. From the window 68 the strip is arranged for being transmitted across the openings 72 and 73 of the front plate of the frame of the mechanism, and a second loop, as 104, is formed in the strip at the lower part of the frame, the loops 103 and 104 serving to permit the transparent strip, or opaque strip to be intermittingly checked during its transmission, as will be hereinafter more fully explained. Following the formation of the loop 104 the strip is guided under two compression rollers 105 and 106 rotatable between the upper ends of two spaced arms 107 and 108 of a bracket 109. The lower ends of these arms of the bracket are held to a transverse rod 110 rotatable on the lower edge part of the front plate of the frame 64. Also on the rod 110 of the bracket 109 is a spring 111 having one of its ends contacting with the front plate of the frame, while its other end is in contact with one of the arms of this bracket serving to yieldingly force the rollers 105 and 106 toward the front plate of the frame. The rollers 105 and 106 are disposed in the opening 70 of the front plate of the frame for movably forcing the strip also inwardly of this opening so that its apertures will be engaged by the teeth of a sprocket 112 arranged on the shaft 78 so as to be partly disposed through the opening 70, this sprocket being preferably similar to the sprocket 102, and to limit the movement of the bracket 109 for regulating the pressure of the rollers 105 and 106 on this sprocket, on the bracket is a set screw 112ª which is screwed through a threaded opening in a bracket 112ᵇ arranged on this bracket for adjustable contact with the front plate of the frame. From its engagement with the sprocket 112 the strip is disposed downwardly between two rollers 113 and 114 arranged on the front plate 67 of the frame 64 transversely in front of the opening 68 in the lower part of this front plate, and from these rollers the film is guided through the opening 61 into the magazine 57, over the roller 60 in the magazine, thence it is wrapped on the receiving reel 59. The receiving reel 59 is revoluble by the operation of the mechanism 63 for wrapping the strip on the receiving reel, and to accomplish this, on the shaft 78 and disposed in the opening 71 of the front plate of the machine is a pulley 115, and over this pulley as well as over the pulley 62 on the post 58 of the receiving reel is guided a belt 116. When the mechanism 63 is operated for driving the shafts 77 and 78 the sprocket 102 will be revolved to transmit the strip from the delivery reel 51 through the opening 56, between the rollers 92 and 93 toward the windows 68 and 20, while the other end part of the strip is transmitted by the sprocket 112 to the rollers 113 and 114. With the rotation of the sprockets 102 and 112 together with the driving of the shaft 78 the pulley 115 will be revolved for driving the belt 116 to impart rotation to the pulley 62, post 58, and the receiving reel 59, and by first fastening the end of the strip to this reel the strip will be wrapped on the reel simultaneously with its transmission through the machine after being guided through the opening 61 leading into the magazine 57.

Figure 3:
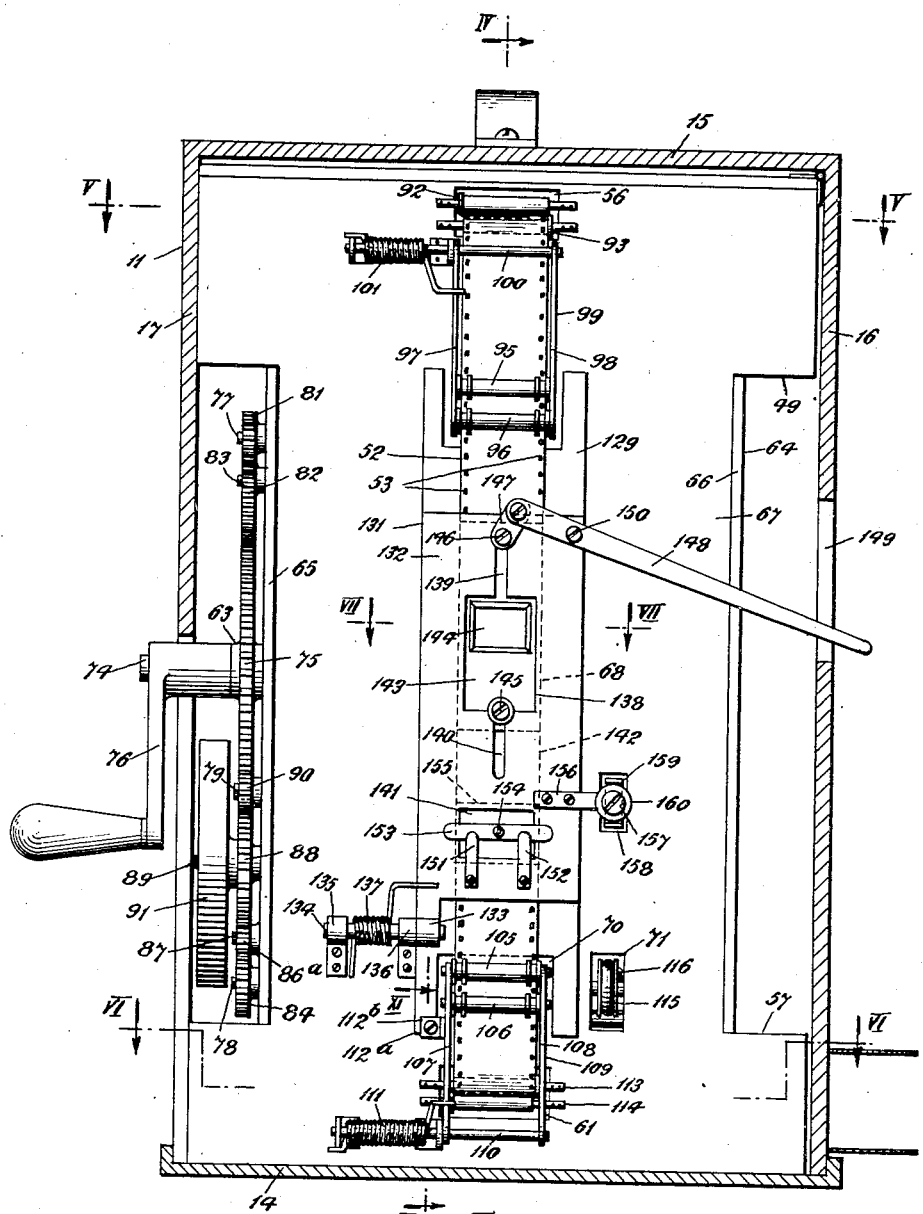
Fig. 3 is a transverse vertical section taken through the casing showing in detail a front view of the frame and parts of the transmitting mechanism.

In order to cause the strip to be intermittently transmitted before the exposure window 68 of the frame 64 as well as before the exposure window 20 of the main section of the casing, a continuously rotatable element, as 117, is provided for engaging the strip at intervals. The element 117 is preferably in the form of a sprocket having two spaced circular disks 118 and 119, each of which is revolubly disposed in each of the openings 72 and 73 of the frame 64 so as to partially extend therethrough. Projecting from corresponding parts of the peripheries of the circular disks 118 and 119 are similar sets of spaced teeth, as 122, and the teeth of both sets are in alinement. The teeth of each set of the continuously rotatable element, or sprocket 117 are spaced apart at distances similar to the spacing of the apertures of the transparent strip, or opaque strip to allow this element to engage the strip for transmitting it before the windows 68 and 20, and each set of the teeth of each of the disks 118 and 119 occupy a space approximately one-fourth of the circumference of the disk so that the strip will be intermittently held before the exposure windows for considerably longer periods than usual, though these sets of teeth may be otherwise relatively arranged in other forms of the element when it is desired to intermittently transmit the strip at various speeds before the exposure windows. The element, or sprocket 117 is held on a shaft 124 journaled in bearings, as 125 and 126, provided on the back of the front plate 67 of the frame 64, and on this shaft is a gear 127 in mesh with a gear 128 held on the shaft 79. The gears 127 and 128 are of the diameters so as to drive the shaft 124 with the element, or sprocket 117 at speeds similar to the driving of the sprockets 102 and 112, though these gears may be of other diameters so as to drive the element 117 at different speeds. By providing the continuously rotatable element, or sprocket 117 and operating it in this manner a transparent strip, or opaque strip may be transmitted before the windows 68 and 20 as well as being intermittently checked for exposing successive parts of the strip to the lens in the barrel 40. A portion of the front plate 67 of the frame 64 surrounding the window 68 is enlarged in thickness, as at 129 Figs. 3 and 7, and the outer surface of this front plate is grooved vertically, as at 130. The groove 130 is somewhat wider than the window 68 as well as being slightly wider than the transparent strip, or the opaque strip to allow the strip to be freely movable therein, the strip being arranged in this recess for transmission before the window 68 and back of the window 20 across the optical axis of the lens in the barrel 40.

Serving to yieldingly hold the strip during its transmission and also to register successive parts of the strip with these exposure windows, a framing device, as 131, is provided. The framing device has a plate 132, and the lower end of this plate is yieldingly pivoted to the thick part 129 of the front plate of the frame by providing on its lower end a bearing 133 in which is journaled a shaft 134 extending transversely on the front plate 67 of the frame 64, and the shaft is also journaled in two spaced bearings 135 and 136 held on this front plate. On the shaft between the bearings 135 and 136 is a spring 137, one end of which contacts with the front plate, while the other end of the spring is in contact with the plate 132 for serving to normally force this plate toward the front plate of the frame. This plate of the framing device is thereby arranged so that its upper end may be yieldingly swung outwardly from the front plate of the frame. Through the central part of the plate 132 is an opening 138 in register with the window 68 of the front plate of the frame, while in the plate 132 extending upwardly from the opening 138 is a communicating slot 139, and extending downwardly in this plate from the opening 138 is a second communicating slot 140. Through the lower part of the plate 132 is another opening 141 in register with the openings 72 and 73 of the front plate 67 of the frame 64, and the back surface of this plate is vertically grooved, as at 142, this groove being in opposed relation as well as being of the same width as the groove 130 of the front plate of the frame. Movable in the grooves 130 and 142 is a plate, as 143, having in its central part an opening, or window 144 which is smaller in size than the opening 138 of the plate 132 and the window 68 of the front plate of the frame 64, and this window 144 is slightly larger than the size of the usual pictures on a transparent strip, or opaque strip. The plate 43 is adjustable in the grooves 130 and 142 so as to be raised and lowered for framing the pictures of the strip with the window 20 of the main section of the casing for projection when being exhibited, or for exposing successive parts of the transparent strip, or opaque strip when the pictures are taken, and to cause this plate to be accurately guided in the grooves, projecting from the lower part of the plate is a screw, or pin 145 which is movably disposed through the slot 140 of the plate 132 while projecting from the upper part of the plate 143 is a second screw, or pin 146 which is movable in the slot 139. To the screw 146 on the front of the plate 132 of the framing device is rotatably held one end of a link 147 having its other end pivoted to one end of a bar, or handle 148 which is of length so that its other end extends on a downward incline laterally with respect to the front plate 67 of the frame 64 and out of an opening 149 in the side wall 16 of the main section 11 of the casing 10 to allow the handle to be operated from the exterior of the casing. The handle 148 is fulcrumed at 150, to the upper end of the plate 132 of the framing device so that when the free end of the handle is raised the link 147 and the apertured plate 143 will be lowered in the grooves 130 and 142, and this apertured plate will be raised in the grooves when the free end of the handle is lowered. On the lower part of the plate 132 of the framing device are secured the lower ends of two spaced spring fingers 151 and 152, and on the upper ends of these fingers is a bar 153 disposed crosswise of the central part of the opening 141 of the plate 132. To the bar 153 is pivoted, at 154, a block 155 which is arranged in yielding contact with the strip by the action of the spring fingers 151 and 152 for movably holding the strip on the intermittent operating element, or sprocket 117. In order to cause the front plate 132 to be intermittently spaced slightly from the plate 67 of the frame simultaneously with the intermittent transmission of the strip so as to avoid binding the strip, in the groove 130 extending in a lateral derection from one edge of the plate 132 of the framing device is a bar 156 having a threaded orifice in which is rotated a screw, or bolt 157 disposed so that one of its ends extends through an opening 158 in the front plate 67 of the frame 64. Arranged on the shaft 79 of the operating mechanism is a cam, as 159, which is somewhat elliptical, or rectangular in shape so that its ends will at intervals contact with the end of the screw, or bolt 157 in the opening 158 of the front plate 67 of the frame 64, and when this bolt is suitably adjusted in the bar 156 it is releasably held by a finger nut 160 adjustably threaded on the bolt. When the shaft 79 is driven, as hereinbefore explained, the ends of the cam 159 will engage the bolt 157 at intervals, and the entire framing device will be slightly spaced from the frame of the operating mechanism against the tension of the spring 137 to allow proper movement of the strip, this spring serving to cause the framing device to be reversely swung on the frame of the operating mechanism when free of its intermittent movement by the cam. While I have shown and described the framing device 131 I do not claim it as part of this present invention as any suitable framing device may be used instead.

When the machine is employed as a camera, the front section or chamber 12 as well as the rear section, or chamber 13 are removed from the main section, or chamber 11 of the casing 10 by withdrawing the grooved flanges of the front and rear sections from the grooved flanges of the main section. In the grooved flanges 22 and 23 of the front wall of the main section of the casing is removably inserted a slide, as 161 Figs. 1, 4, 15, and through this slide is an aperture, or window 162 arranged so as to be registered with the window 20 of the main section of the casing when the slide is applied thereto. Transversely of the front part of the slide 161 are two parallel spaced projecting grooved flanges 163 and 164, one adjacent to the top and one adjacent to the lower edges of the aperture 162 of the slide, and the grooves of these flanges are in opposed relation. In these transverse grooves of the slide 161 is removably disposed the slide 39 on which is mounted the barrel 40 having the lens 41 for taking pictures, the slide 39 with the barrel being arranged for the optical axis of this photographic lens 41 to be alined with the center of the exposure window 20 and aperture 162 of the slide 161. A sensitized transparent strip, or an opaque strip is then arranged in the machine for intermittent transmission therethrough, as above explained, so that successive parts thereof will be consecutively exposed to the photographic lens. The negative of the pictures of the objects thereby taken are subsequently developed by the usual, or any preferred means.

Figure 2:
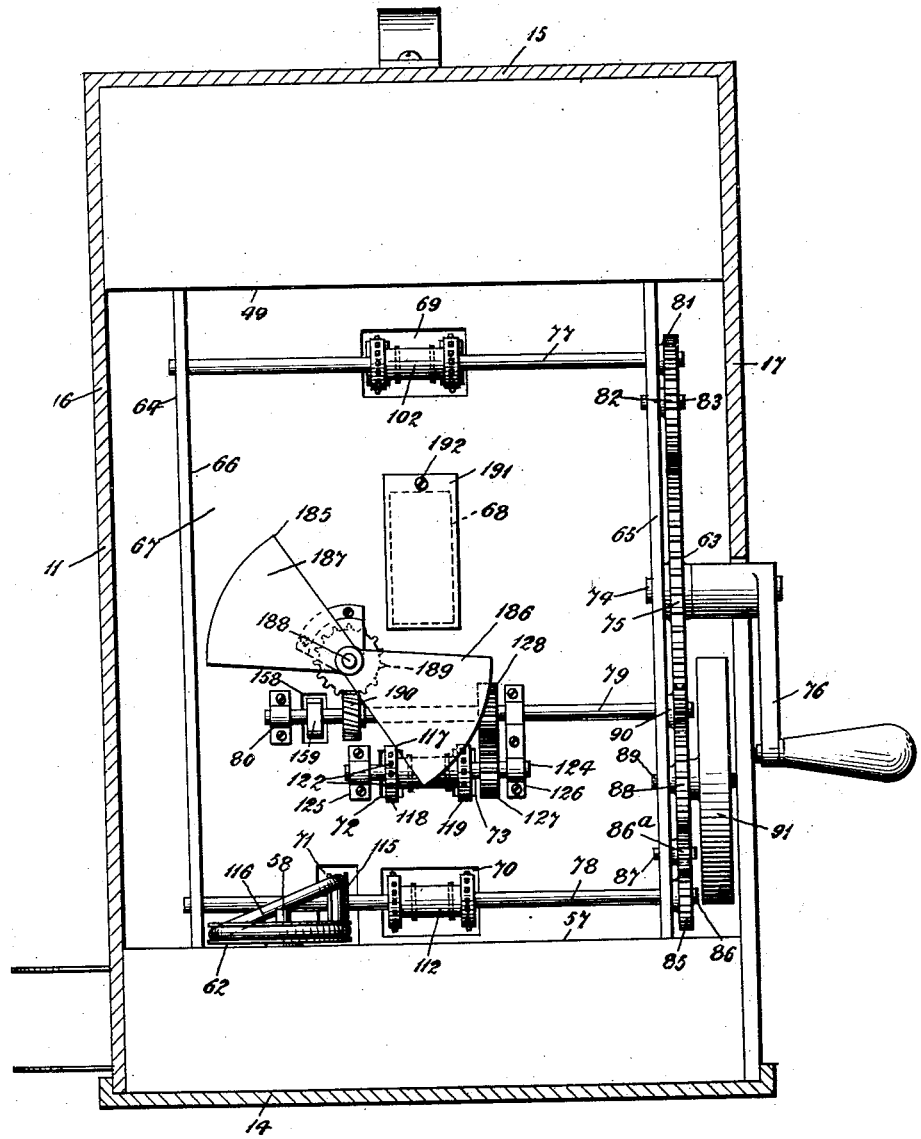
Fig. 2 is a transverse vertical section taken through the casing showing in detail a rear view of the frame and parts of the transmitting mechanism.
Figure 4:
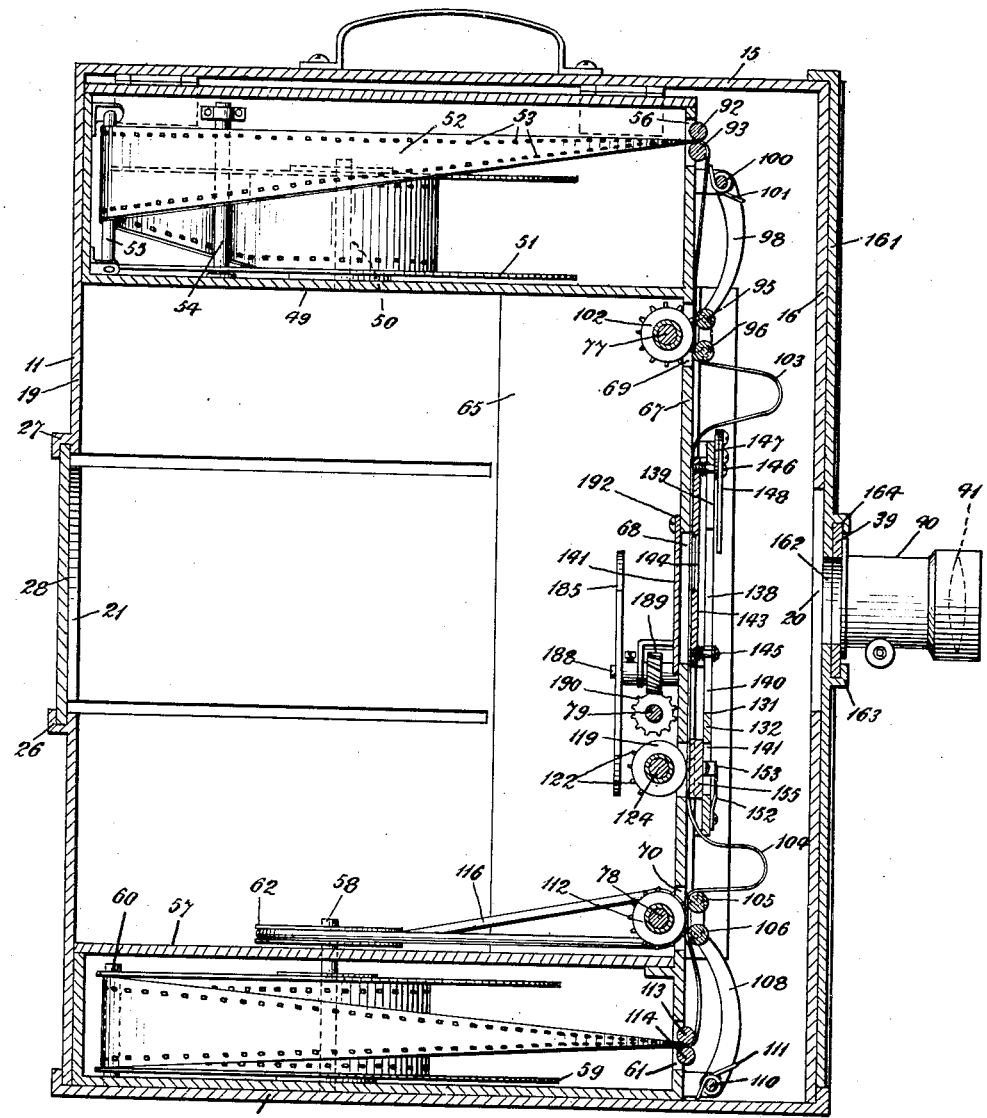
Fig. 4 is a sectional view, partly in detail, taken on the line IV—IV of Fig. 3.

When it is desired to exhibit the pictures on a screen which have been produced on the transparent film or strip, the transparent strip is arranged in the machine, as explained, for intermittent transmission before the exposure window 20, and a slide similar to the slide 39 with a barrel, as 166, having a projecting lens 167 Figs. 13 and 14, are removably applied on the slide 161 of the main section of the casing instead of the slide 39 with the barrel 40 and photographic lens 41. The rear section, or chamber 13 of the casing 10 is detachably applied on the back of the main section of the casing by interfitting the grooved flanges 47 and 48 of this rear section with the grooved flanges 24 and 25 of the main section of the casing, and in the rear section, or chamber 13 may be one, or more lamps 168 which is preferably of a class adapted to be lighted by a normally open electric circuit, as 169 Fig. 13. The electric circuit 169 may lead from any suitable source of supply, for instance from a battery 170 which may be conveniently arranged, and from one terminal of this battery is a wire 171 leading to one pole of the electric lamp. From the second terminal of the battery is a wire 172 leading to a switch 173 adapted to be swung into and out of engagement with the contact 174 of a wire 175 leading to the second pole of the electric lamp 168. To close the circuit 169 to light the lamp 168 the switch 173 is moved into engagement wtih the contact 174, and the current will flow from the battery over the wire 171 to the lamp as well as passing back from the lamp over the wire 175, contact 174 through the switch 173, and over the wire 172 to the battery, and the lamp will be lighted, the light of the lamp being extinguished by swinging the switch out of engagement with the contact 174 for opening the circuit. The electric lamp 168 is mounted in a reflector, as 176, which is preferably parabolic in shape, and this reflector may be in the form of a mirror arranged so that its concavity will deflect the rays of the lamp through the exposure window 20 of the main section of the casing and through the transparent strip for projection by the lens 167. The lamp 168 and reflector 176 are adjustable toward and from the exposure window 20 of the main section of the casing 10 for regulating the light deflected from the lamp on the pictures when being projected. To accomplish this the reflector 176 is provided with two oppositely disposed sleeves 177 and 178, Figs. 13 and 14, one under and one above the reflector, and these sleeves are movable on two spaced stationary guide rods 179 and 180 extending longitudinally from the back wall 46 of the rear section 13 of the casing 10, through the opening 21 in the back wall of the main section of the casing as well as extending into the interior of this main section. From the sleeve 177 below the reflector 176 is a transverse rod 181, and from the sleeve 178 above the reflector is another transverse rod 182. The transverse rods 181 and 182 are freely movable in pairs of longitudinally disposed slots 183 and 184 one pair being provided in each of the side walls of the main section as well as in the side walls of the rear section of the casing, and the rods 181 and 182 are of lengths so that their free ends extend some distances beyond the casing 10 to permit the rods to be manually guided back and forth in the pairs of slots for suitably adjusting the lamp 168 and the reflector 176 on the rods 179 and 180 to and from the window 20 of the main section of the casing as well as to and from the pictures on the transparent film, or strip during their projection. In order to intermittently cut-off the light from the lamp when the pictures of the transparent strip are being projected, a shutter, as 185 Figs. 2 and 4, is provided. The shutter 185 may be of any well known, or preferred form having one, two or more blades, 186 and 187 adapted to be guided across the rays of light from lamp 168 when the shutter is rotated and this shutter is held on a short shaft, or stud 188 journaled in a bearing projecting from the back of the front plate 67 of the frame 64 of the operating mechanism of the machine. On the stud 188 is a worm gear 189 which is in mesh with a second worm gear 190, held on the shaft 79 of the operating mechanism so that when this shaft 79 is driven by the operation of the machine for transmitting the transparent film to exhibit the pictures thereof, as above described, the worm gears 189 and 190 will be operated to revolve the stud 188 and the shutter 185. The light from the lamp 168 projected on the pictures by the reflector 176 will thereby be intermittently cut-off for properly projecting the pictures.

When it is desired to exhibit the pictures on a screen which have been produced on the opaque strip, the strip is arranged in the machine in a manner similar to arranging the transparent film, or strip, and the opaque strip is also likewise intermittently transmitted before the exposure window 20 by operating the mechanism 63. The passage through the window 68 of the front plate 67 of the frame of the mechanism is closed by a door 191 which is pivoted, at 192, to the rear surface of the front plate of the frame so that the door may be swung in lateral directions to open and close the window 68. The slide 161 with the lens barrel 166 are removed from the front of the main section 11 of the casing 10 by being withdrawn from the grooved flanges 22 and 23 of this main section. The front section, or chamber 12 of the casing is then removably applied to the main section of the casing by inserting the grooved flanges 34 and 35 of the front section into the grooved flanges 22 and 23 of the main section of the casing. A slide 193 with a barrel 194 having a projecting lens 195, Figs. 12, 13, 14, are removably mounted on the front of the section 12 of the casing by this slide being disposed in the grooved transverse flanges 37 and 38 of this front section, the slide 193 having an opening 196 arranged in the optical axis of the lens 195 as well as in register with the opening 36 of the front wall of this front section of the casing. Serving to cause the pictures of the opaque strip to be projected through the lens 195, on the inner surface of the front wall 33 of the section 12 of the casing may be one, or a number of lamps 197, and all of these lamps may be mounted in one reflector, or each lamp may be mounted in a single reflector, as 198. The reflectors 198 are arranged so as to deflect the rays of light from the lamps 197 through the window 20 of the main section 11 of the casing, and on each consecutive picture of the opaque strip when exposed through this window, and the lamps 197 are preferably electrically lighted through the medium of a normally open electric circuit, as 199, which may be provided in any suitable manner. The electric circuit may lead from any desired source of supply, such as a battery 200, and from one terminal of this battery is a wire 201 leading to one pole of the lamps all of which are included in the single circuit. From the second terminal of the battery is a wire 202 leading to a switch 203 adapted to be swung into engagement with a contact 204 provided on one end of a wire 205 having its other end connected to the second pole of the lamps 197. When the switch 203 is moved into engagement with the contact 204 the circuit will be closed from the battery 200 over the wire 201 to the lamps as well as through the lamps over the wire 205, through the switch 203 and over the wire 202 to and through the battery. The lamps will then be lighted for deflection of the light upon the pictures which in turn will be projected by the lens 195 upon the screen, and by disengaging the switch 203 from the contact 204 the circuit will be opened for extinguishing the light of the lamps. Thus a moving picture machine is provided which may be employed as a camera whereby animated pictures of objects may be photographed on a sensitized transparent film or strip, or on an opaque strip as well as being subsequently employed as a projecting apparatus for exhibiting the pictures of either, or both the transparent strip, or the opaque strip on a screen, it being understood that the invention further contemplates the use of the machine independently as an apparatus for projecting the pictures of an opaque strip, or for projecting the pictures of a transparent film, or strip, or for taking the pictures on either, an opaque strip or a transparent strip, these advantages being separate and distinct objects of the invention.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. In a moving picture machine, mechanism for transmitting a strip so that successive parts of the strip will be exposed to a lens, a continuously rotatable element driven by the mechanism, formed so as to engage parts of the strip at intervals for causing the movement of the strip to be intermittently checked before the lens during its transmission, a lamp back of the strip, a reflector in which the lamp is mounted, the said reflector and lamp being adjustable to and from the strip, a second lamp in front of the strip, and a reflector in which the second lamp is mounted, for the purpose specified.

2. In a moving picture machine, mechanism for transmitting a strip so that successive parts of the strip will be exposed to a lens, a continuously rotatable element driven by the mechanism, formed so as to engage parts of the strip at intervals for causing the movement of the strip to be intermittently checked before the lens during its transmission, a lamp back of the strip, a reflector in which the lamp is mounted, the said reflector and lamp being adjustable to and from the strip, a plurality of lamps in front of the strip, and a plurality of reflectors in each of which is mounted one of the lamps, for the purpose specified.

3. In a moving picture machine, mechanism for intermittently transmitting a strip so that successive parts of the strip will be exposed to a lens, a lamp back of the strip, a reflector in which the lamp is mounted, the said reflector and lamp being adjustable to and from the strip, a second lamp in front of the strip, and a reflector in which the second lamp is mounted, for the purpose specified.

4. In a moving picture machine, mechanism for intermittently transmitting a strip so that successive parts of the strip will be exposed to a lens, a lamp back of the strip, a reflector in which the lamp is mounted, the said reflector and lamp being adjustable to and from the strip, a plurality of lamps in front of the strip, and a plurality of reflectors in each of which is mounted one of the second lamps, for the purpose specified.

This specification signed and witnessed this 21 day of March, A. D. 1919.

FREDERICK W. HOCHSTETTER.

Witnesses:
J. FREDERICK CRYER,
D. KOEPER.